United States Patent [19]

Shelor

[11] E Re. 31,065

[45] Reissued Oct. 26, 1982

[54] STEAM DISTRIBUTION SYSTEM

[75] Inventor: Clifford D. Shelor, Charleston, S.C.

[73] Assignee: Westvaco Corporation, New York, N.Y.

[21] Appl. No.: 137,568

[22] Filed: Apr. 7, 1980

Related U.S. Patent Documents

Reissue of:

[64] Patent No.: 3,574,338
Issued: Apr. 13, 1971
Appl. No.: 877,615
Filed: Nov. 18, 1969

[51] Int. Cl.[3] ..... B05B 1/14; D21F 5/18

[52] U.S. Cl. ..... 239/120; 34/155; 162/310; 162/359; 239/553.3; 239/557; 239/562

[58] Field of Search ..... 239/120, 550, 553, 553.3, 239/556, 557, 562, 569, DIG. 1; 34/155, 160; 162/290, 297, 308-310, 359, 375

[56] References Cited

U.S. PATENT DOCUMENTS

| | | | |
|---|---|---|---|
| 1,624,154 | 9/1927 | Kemp | 239/556 |
| 2,642,314 | 6/1953 | Dupasquier | 239/120 X |
| 2,714,839 | 8/1955 | Mazer | 162/297 X |
| 2,736,107 | 2/1956 | Dungler | 34/160 |
| 2,760,410 | 8/1956 | Gillis | 34/155 X |
| 2,838,982 | 6/1958 | Dupasquier | 162/290 X |
| 3,037,706 | 6/1962 | Dupasquier | 239/120 |
| 3,058,672 | 10/1962 | Zabel | 137/403 X |
| 3,089,252 | 5/1963 | Daane et al. | 239/557 X |
| 3,097,994 | 7/1963 | Dickens et al. | 34/160 X |
| 3,242,587 | 3/1966 | Dupasquier | 34/160 X |
| 3,508,711 | 4/1970 | Switall | 239/562 |

FOREIGN PATENT DOCUMENTS

| | | | |
|---|---|---|---|
| 638651 | 3/1962 | Canada | 239/550 |
| 25195 | 10/1952 | Finland . | |
| 335740 | 4/1921 | Fed. Rep. of Germany . | |
| 44428 | 6/1917 | Sweden . | |
| 133230 | 10/1951 | Sweden . | |
| 257449 | 9/1926 | United Kingdom . | |
| 726571 | 3/1955 | United Kingdom . | |
| 825924 | 12/1959 | United Kingdom . | |

*Primary Examiner*—Andres Kashnikow
*Attorney, Agent, or Firm*—W. Allen Marcontell; Richard L. Schmalz

[57] ABSTRACT

A system for distributing steam to a travelling web includes an elongated chamber having numerous steam distribution outlets arranged therealong and a steam inlet manifold extending lengthwise along the interior of the chamber. A plurality of ports formed along the manifold serve to admit steam from the manifold to the chamber. A system of manually adjustable valves individually controls the amount of fluid passing through each port from the manifold into the chamber to thereby enable an operator to selectively establish various profiles of steam distribution. In a preferred embodiment the system is located above the web. The steam distribution outlets are directed downwardly and each is surrounded on the interior of the chamber by an upstanding ferrule which prevents condensation from passing from the chamber onto the web.

15 Claims, 4 Drawing Figures

STEAM DISTRIBUTION SYSTEM

Matter enclosed in heavy brackets [ ] appears in the original patent but forms no part of this reissue specification; matter printed in italics indicates the additions made by reissue.

SUMMARY OF THE INVENTION

Apparatus for controllably distributing steam upon a surface includes a steam distribution chamber having a multiplicity of spaced steam distribution outlets. The inlet for the steam distribution chamber includes a plurality of ports arranged for individual fluid communication with the chamber. Associated with each of the ports is a valve means by which the fluid flow from the ports to the chamber is controlled. By the valve means, a high degree of regulation is exerted upon the pattern of fluid flow into the chamber. The result is variable control of the total volume of steam output from the chamber and also of the volumetric pattern of steam output across the area in which the steam distribution outlets appear. The volumetric pattern of steam output across the area in which the steam distribution outlets appear is herein designated the steam distribution profile.

In the preferred embodiment, an elongated inlet manifold defines the inlet ports and is enclosed by an elongated housing which forms a steam distribution chamber surrounding the manifold. The ports are arranged along the length of the manifold so as to admit steam into the chamber along its entire length. A valve is provided at each port for individually controlling the flow therethrough. Formed along the length of the chamber are a multiplicity of steam distribution outlets through which the steam passes to the material upon which it is being applied. The steam distribution profile in this embodiment is the volumetric pattern of steam output along the length of the chamber. It will readily be appreciated that the profile at the steam distribution outlets is a function of the amount of steam passing from the manifold, through each of the various ports, into the chamber. Since each valve is individually controllable, the apparatus is capable of selectively providing a wide variety of steam distribution profiles. Valve adjustment may be designed to produce even flow through all the steam distribution outlets (i.e., a flat steam distribution profile). On the other hand, if an irregular profile is desired, the valves may be adjusted to provide greater flow through steam distribution outlets in certain selected areas of the chamber.

Each of the steam distribution outlets of the preferred embodiment is surrounded by an inwardly extending ferrule. These ferrules serve to prevent the passage of condensation through the outlets when the outlets are downwardly directed.

A primary object of this invention is to provide a steam distribution system which is adjustable to selectively vary the volumetric pattern of steam output across a surface having a multiplicity of steam outlets.

Another object of this invention is to provide a steam distribution system having a manifold which delivers steam to a steam distribution chamber through a plurality of valved ports.

A further object of this invention is to provide a steam distribution system having an improved condensate drain system.

DETAILED DESCRIPTION OF A PREFERRED EMBODIMENT

The steam application system of this invention is particularly useful for steam drying a continuously moving paper web during formation thereof. The application of dry steam to such a web raises its temperature and thereby raises the temperature of water retained therein. The viscosity of water decreases as its temperature increases and the decrease in viscosity, of course, serves to facilitate water removal during the paper formation. Numerous locations along the papermaking machine are appropriate for steam application. Two are illustrated in connection with the apparatus of FIG. 1.

Figure 1:
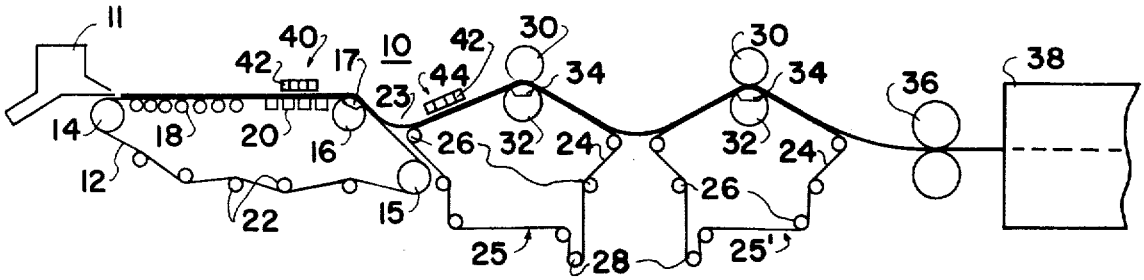
FIG. 1 is a schematic view illustrating the steam distribution apparatus of this invention in use with a papermaking machine.

The Fourdrinier type papermaking machine 10 illustrated in FIG. 1 comprises a headbox 11 for delivering stock consisting of a fiber slurry to a Fourdrinier wire 12. The Fourdrinier wire is trained over a breast roll 14, a couch roll 16 and a turning roll 15. Beneath the upper path of the Fourdrinier wire are a plurality of table rolls 18 and a plurality of vacuum boxes 20 for draining fluid from the slurry, to form web 23 upon the wire 12. A plurality of idler and guide rolls 22 are provided for the lower path of wire 12. Couch roll 16 includes suction gland 17 for removing additional fluid from the web as the web passes over the couch roll and just before it leaves the wire.

From the Fourdrinier wire, the web passes through a press section and then through a drier section. The press section illustrated in FIG. 1 comprises first and second-like press stations 25 and 25, respectively. Each station includes a loop of felt 24 drawn over a series of idler and guide rolls 26 and a stretch roll 28. Along the upper path of felt loop 24 is mounted a pair of wringer rolls 30 and 32. Included in each wringer roll 32 is a suction box 34. The wringer rolls press the web against the felt and, in cooperation with suction gland 34, remove additional fluid from the web. From the press stations 25 and 25' the web passes through a smoothing press 36 and thence to driers 38.

Steam applicators installed at a given location may include a bank of applicators or a single applicator. Referring again to FIG. 1, a bank 40 of individual steam distributors 42 are installed over the Fourdrinier wire in advance of couch roll 16; a second bank 44 of individual steam distributors 42 are installed over the first breast station 25, in advance of wringer rolls 30 and 32. During the papermaking operation, the banks of steam distributors operate to increase the temperature of the web at the designated locations. In the manner discussed above, the lowered viscosity of the water in the web enhances water removal operations and results in an increase in the amount of water drawn from the web as it passes over vacuum gland 17 in couch roll 16 and as it passes between wringer rolls 30 and 32, over suction gland 34.

Figure 2:
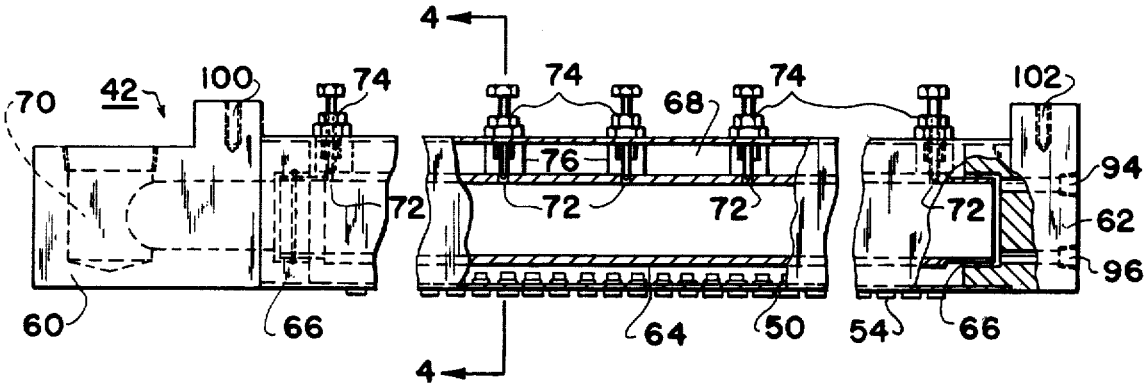
FIG. 2 is a partially broken away elevational view showing a preferred embodiment of this invention.
Figure 3:
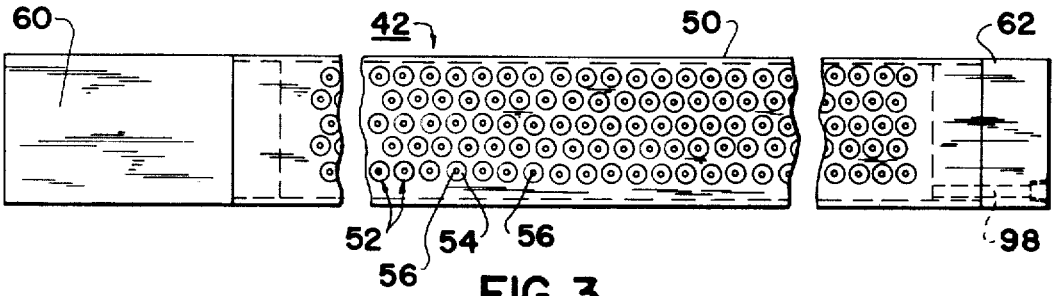
FIG. 3 is a plan view of the apparatus shown in FIG. 2.
Figure 4:
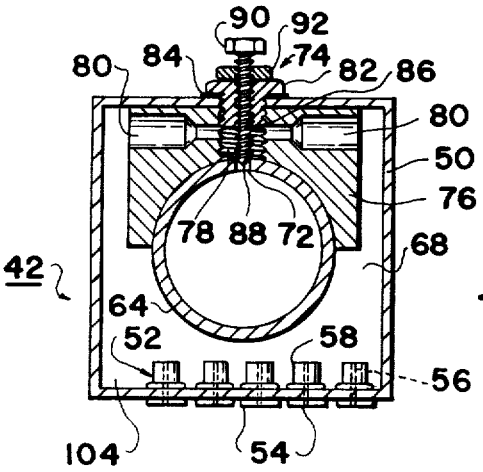
FIG. 4 is a cross-sectional view taken along lines 4—4 of FIG. 2.

A steam applicator 42 will now be described in detail in connection with FIGS. 2 through 4. A tubular housing 50 forms an elongated steam distribution chamber 68 having a multiplicity of steam distribution outlets 52, each of which consists of an opening in the housing having a ferrule 54 set therein. The ferrule includes a central bore 56, which determines the effective size of steam distribution outlet, and an upstanding portion 58. Portion 58 forms a fluid barrier which serves to prevent the passage from the steam distribution chamber of any condensation which may form therein during operation of the steam distribution apparatus, when steam distribution outlets 52 are downwardly directed, as will be more fully explained below.

Tubular housing 50 is supported by end sections 60 and 62. Supported within housing 50 by end sections 60 and 62 is a cylindrical manifold 64 having a diameter which is less than the width of tubular housing 50. Steam distribution chamber 68 surrounds manifold 64. Each end of manifold 64 is sealed by an O-ring 66 to prevent undersired fluid communication between chamber 68 and the inside of manifold 64.

A steam inlet passage 70 is provided in end section 60 for delivering steam to the manifold. A plurality of ports 72 are provided along the surface of manifold 64 and directed [way] *away* from steam distribution outlets 52. There is provided in association with each of these ports, a needle valve assembly 74 for controlling the passage of steam through each port. In the vicinity of each of these needle valves is a saddle 76 which assists in maintaining manifold 64 and housing 50 in proper relationship to each other.

Each of the saddles 76 forms a threaded opening 78 for mounting a needle valve 74. The needle valves 74 each comprise a threaded screw 82, a lock washer and seal 84, a threaded valve steam 86 having seat 88 and head 90 and a lock nut 92. The screw 82 is tightened into the upper portion of threaded opening 78 of saddle 76. A fluid seal is formed by lock washer and seal 84. Steam passages 80 extend from a lower portion of opening 78 through the saddle so as to direct steam from manifold 64 outwardly against the lateral sides of housing 50. A threaded bore [83] formed in each screw 82 receives the threaded shank of the valve steam 86 so that the seat 88 of the valve stem is positioned for variably controlling fluid passage through the port 72. The head 90 of the valve stem is exposed exteriorly of the housing 50 so that the valve stem may be manually turned to raise and the lower the seat 88 relative to the port. Lock nut 92 is provided for securely retaining the valve steam 86 in its selected position.

End 62 of the steam distribution apparatus forms a tap 94 for a steam pressure gauge, not shown, and a tap 96 adapted to receive a drain valve means, not shown, for drawing off condensate from the interior of manifold 64. Also formed in end section 62 is tap 98 also adapted to receive a drain valve, not shown, for drawing off any condensate which may collect within chamber 68. It should be noted that, in applications where a continuous flow of steam through the manifold is desired, the conduit forming the manifold [62] *64* may continue through end section 62, thus eliminating the need for taps 94 and 96 and their associated equipment.

The steam application 42 is mounted above Fourdrinier machine 10 in any convenient manner. End sections 60 and 62 include threaded mounting bores 100 and 102 to assist in the attachment of applicator 42 to a suitable supporting structure, not shown.

In operation, steam is admitted into the manifold 64 through the steam inlet passage 70 at a sufficiently elevated temperature and pressure to yield superheated steam. From manifold 64 the steam passes through the ports 72 into the lower portions of threaded openings 78 in saddles 76 and thence out through steam passages 80 into chamber 68. The amount of steam passing through any given valve 74 is dependent upon the selected adjustment of that individual valve. As the steam passes from the manifold into the chamber it experiences a pressure drop. The throttling process which occurs increases the superheated quality of the steam and thereby provides, at the outlets 52, a more efficient steam for heating the web of paper. The steam distributors are placed as near as practical to the web. A spacing of about 1 inch provides enough clearance to avoid interference with the web by the steam distributing apparatus while allowing the steam to traverse the space with a minimum of heat loss. Any steam which condenses in manifold 64 or chamber 68 will be drawn off through drains mounted at taps 66 and 68, respectively. The raised water barriers 58 established by the ferrules 54 prevent the passage of condensation through the steam distribution outlets 52.

In certain locations steam distribution apparatus of this invention is installed for applying steam to a sloping surface. Such a situation is illustrated in FIG. 1 where bank 44 of steam distributors 42 are installed over press station 25. In this application the space 104 within the lower corner chamber 68 serves as a passage to conduct condensate to the drain associated with tap 98. The space 104 is sufficiently large to avoid spillage of the condensate over the fluid barrier established by the ferrules 54.

It can be seen that installation of the steam distribution apparatus of this invention along papermaking machine 10 will serve to heat the web of paper being formed upon the machine and facilitate removal of water therefrom in the manner described above. Specifically, an application of steam just prior to couch roll 17 and above press station 25 in advance of wringer rolls 30 and 32 heats the web so as to reduce the viscosity of the fluid retained therein and thereby permit an increased amount of fluid to be removed as the web passes over the couch roll and between the wringer rolls, respectively.

The spacing of ports 72 and steam distribution outlets 52 can be determined according to the pattern which best suits a given application. Generally, best results are obtained when the diameters of the outlets range between one-eighth inch and three-sixteenths inches, the distance between the jets within a row and between the rows of jets falls within the range from one-half inch to three-fourths inch, and the sum of the open area defined by the outlets equals substantially 4 percent of the area of the plate required to support the outlets. In the preferred embodiment, bores 56 of the steam distribution outlets 52 are one-fourth inch in diameter and arranged in rows. The distance between the rows and also the distance between any two outlets within a row equals five-eights of an inch and the rows are staggered so that the outlets from the equilateral triangular pattern apparent in FIG. 3. With this outlet configuration, the sum of the open areas defined by the outlets is substantially 4 percent of the area of the plate required to support them. Further, in the preferred embodiments, it has been found that substantial steam distribution profile control can be obtained when valved ports occur at approximately 3⅛ intervals along the manifold 64.

It is to be understood that the foregoing description of a preferred embodiment and that the invention is not limited to the specific apparatus shown and described. Therefore changes may be made in the described preferred embodiment without departing from the scope of the invention.

I claim:

1. Apparatus for distributing steam *onto a traveling paper machine web* comprising:

a. *first* means forming a *single, continuous* chamber *space extending substantially across the width dimension of said web and* having a multiplicity of steam distribution outlets spaced *uniformly* along a *surface* portion of [its surface] *said first means adjacent said web* b. *second* means forming a [plurality] *multiplicity* of steam supply ports [in], *each port having individual* fluid communication with diverse portions of said chamber *space*; and c. *third* means for variably regulating the passage of steam through at least a number of said ports individually to effect *continuously transitioned* variation in the distribution of steam throughout said chamber *space* as such steam passes thereinto and thereby produce *continuously transitioned* variation in the steam distribution profile established at said steam distribution outlets.

2. Steam distributing apparatus according to claim 1 wherein said *third* means for variably regulating the passage of steam through a number of said ports comprises a plurality of valves, each valve being mounted for regulating the passage of steam through *a respective* one of said number of ports.

3. Steam distributing apparatus according to claim 2 wherein the passage of steam through all of said steam supply ports is variably regulated by said plurality of valves.

4. Steam distributing apparatus according to claim 3 wherein said steam distribution outlets are substantially downwardly directed, further comprising *fourth* means forming a raised water barrier surrounding each of said steam distribution outlets internally of *said* chamber *space* for resisting passage of condensation from the interior of said chamber *space* through said outlets.

5. Steam distributing apparatus according to claim 1 wherein said steam distribution outlets are substantially downwardly directed, further comprising *fourth* means forming a raised water barrier surrounding each of said steam distribution outlets internally of said chamber *space* for resisting passage of condensation from the interior of said chamber *space* through said outlets.

6. Steam distributing apparatus according to claim 1 wherein said chamber *space* is of polygonal cross section and said steam distribution outlets are grouped in a plane face thereof nearer to the junction of said plane face and one intersecting face than to the junction of said plane face and another intersecting face whereby a condensate conduit is formed at said junction of said plane face and said other intersecting face when said plane face is angularly disposed to the horizontal so that said junction of said plane face and said other face forms the lower extremity of said apparatus.

7. Steam distributing apparatus according to claim 6 further comprising means forming a raised water barrier surrounding at least a portion of said steam distribution outlets internally of said [second] chamber *spaced* for resisting the passage of condensate from the interior of said chamber *space* through said outlets.

8. Steam distributing apparatus according to claim 1 wherein said *second* means forming a plurality of steam supply ports comprises a steam inlet manifold disposed internally of said chamber *space* and connected to a source of supply for conveying steam to diverse portions of said chamber *space* through said ports.

9. Apparatus for distributing steam *across the width of a traveling paper machine web* comprising:

a. an elongated steam inlet manifold [forming] *longitudinally disposed substantially across the width of said web and having* a plurality of ports *distributed* along the length thereof;

b. means forming [an elongated enclosed] *a continuous* chamber [surrounding the] *space enclosing that* portion of said manifold along which said ports are distributed;

c. means forming a multiplicity of steam distribution outlets *distributed* along the length of said chamber *space* and d. a plurality of valves, each valve being mounted for variably regulating the passage of steam from said manifold through an individual port into said continuous chamber *space* to thereby vary the distribution of steam throughout said chamber *space* and permit the establishment of a variety of *continuously transitioned* steam distribution profiles [at] *from* said steam distribution outlets.

10. Apparatus according to claim 9 further comprising means outside of said enclosed chamber *space* for adjusting each of said plurality of valves individually.

11. Apparatus according to claim 9 wherein said steam distribution outlets are substantially downwardly directed, further comprising means forming a raised water barrier surrounding each of said steam distribution outlets internally of said chamber *space* for resisting the passage of condensation through said outlets from the interior of said chamber *space* to the exterior thereof.

12. Apparatus according to claim 9 wherein [paid] *said* steam distribution outlets are arranged along one side of said enclosed chamber *space* and said ports are arranged linearly along said manifold to face in a direction away from said steam distribution outlets.

13. Apparatus for distributing steam upon a travelling web comprising:

a. means forming an elongated chamber *space* adapted to be mounted above and extend substantially *continuously* across said web;

b. means forming a multiplicity of steam distribution outlets *distributed* along the length of a substantially downwardly directed portion of said chamber *space*, c. an elongated steam inlet manifold enclosed within said elongated chamber *space* and extending substantially lengthwise thereof, said manifold forming a plurality of substantially upwardly directed ports *distributed along the length of said manifold* for distributing steam throughout said chamber;

d. a plurality of valves, each one of which regulates the amount of steam passing through one of said ports;

e. means outside of said chamber *space* for variably adjusting each of said plurality of valves individually to thereby vary the distribution of steam throughout said chamber *space* and permit the establishment of a variety of steam distribution profiles at said steam distribution outlets; and f. means forming a raised water barrier surrounding each of said steam distribution outlets internally of said chamber *space* for resisting the passage of condensate through said outlets from the interior of said chamber *space* to the exterior thereof.

*14. An apparatus for distributing steam onto a travelling web of finite width and indefinite length comprising:*

*a. means forming a continuous elongated chamber space extending across at least a substantial portion of the width of said web, said chamber space having an array of steam distribution outlets uniformly spaced along a planar structural surface of said means most proximate of said web, said surface being secured in spaced disposition from said web and substantially parallel therewith;*

*b. means forming a multiplicity of steam supply ports uniformly distributed along the length of said chamber space in fluid communication with diverse portions thereof, said space being substantially open to fluid communication along said length thereof inclusive of said plurality of ports; and*

*c. means for variably regulating the passage of steam through at least a number of said ports, individually, to effect variation in the distribution of steam throughout said chamber space as such steam passes thereinto and thereby produce a continuously transitioned flow distribution profile established at said steam distribution outlets.*

*15. A method of regulating the distribution profile of steam onto a traveling paper web of finite width and indefinite length, such steam being issued from a single distribution chamber space having a continuous void longitudinally disposed across a substantial portion of said web width and through an array of uniformly distributed apertures in chamber enclosing structure adjacent said web, said method comprising the steps of:*

*Supplying steam to said single chamber space from a steam source through a multiplicity of individually flow controllable conduits and adjusting the steam flow rate through each of said conduits to obtain a predetermined and continuously transitioned flow distribution profile of steam issuance from said apertures along the full length of said chamber.*

* * * * *

UNITED STATES PATENT OFFICE

CERTIFICATE OF CORRECTION

PATENT NO. : Re. 31,065

DATED : October 26, 1982

INVENTOR(S) : Clifford D. Shelor

It is certified that error appears in the above-identified patent and that said Letters Patent are hereby corrected as shown below:

Column 2, line 43, the second occurrence of reference character 25 should be --25'--. Column 3, line 44, "steam", should be --stem--. Column 5, line 68 (Claim 7, line 4), "spaced" should be --space--. Column 7, line 21 (Claim 14, line 14), following "said" insert --chamber--.

Signed and Sealed this

First Day of March 1983

[SEAL]

*Attest:*

GERALD J. MOSSINGHOFF

*Attesting Officer*

*Commissioner of Patents and Trademarks*